(12) United States Patent
Encarnacion

(10) Patent No.: US 10,645,904 B2
(45) Date of Patent: May 12, 2020

(54) TRANSPORTABLE PET CARE CENTER

(71) Applicant: Johnnie Mack Brown Encarnacion, Oceanside, CA (US)

(72) Inventor: Johnnie Mack Brown Encarnacion, Oceanside, CA (US)

(*) Notice: Subject to any disclaimer, the term of this patent is extended or adjusted under 35 U.S.C. 154(b) by 0 days.

(21) Appl. No.: 16/520,090

(22) Filed: Jul. 23, 2019

(65) Prior Publication Data

US 2019/0343072 A1    Nov. 14, 2019

Related U.S. Application Data

(62) Division of application No. 15/367,147, filed on Dec. 1, 2016, now Pat. No. 10,357,019.

(60) Provisional application No. 62/261,453, filed on Dec. 1, 2015.

(51) Int. Cl.
| | |
|---|---|
| *A01K 5/02* | (2006.01) |
| *A01K 15/02* | (2006.01) |
| *A01K 29/00* | (2006.01) |
| *A01K 13/00* | (2006.01) |
| *H04N 7/14* | (2006.01) |
| *H04R 1/02* | (2006.01) |

(52) U.S. Cl.
CPC ............ *A01K 5/0225* (2013.01); *A01K 13/00* (2013.01); *A01K 15/025* (2013.01); *A01K 29/00* (2013.01); *H04N 7/142* (2013.01); *H04R 1/028* (2013.01)

(58) Field of Classification Search
CPC ...... A01K 5/0225; A01K 5/0114; A01K 5/02; A01K 39/012; A01K 15/021; A01K 15/025; A01K 15/02; A01K 5/01; A01K 5/0107; A01K 5/0275; A01K 5/0291
See application file for complete search history.

(56) References Cited

U.S. PATENT DOCUMENTS

| | | | |
|---|---|---|---|
| 4,722,300 A | 2/1988 | Walker | |
| 6,273,027 B1* | 8/2001 | Watson | ............. A01K 15/02 119/712 |
| 10,034,453 B2 | 7/2018 | Neighbors | |
| 2006/0011144 A1 | 1/2006 | Kates | |
| 2011/0018994 A1 | 1/2011 | Russoniello | |
| 2012/0240863 A1 | 9/2012 | Araujo | |
| 2013/0300863 A1 | 11/2013 | Tait | |
| 2013/0319337 A1 | 12/2013 | Davis | |
| 2016/0000036 A1* | 1/2016 | Cornwell, Jr. | ....... A01K 5/0291 119/51.11 |
| 2016/0029592 A1 | 2/2016 | Springer | |
| 2016/0257481 A1* | 9/2016 | Milner | ............. A01K 5/0225 |
| 2016/0302383 A1 | 10/2016 | Frieden | |
| 2017/0290290 A1 | 10/2017 | Trottier | |

\* cited by examiner

*Primary Examiner* — Trinh T Nguyen
(74) *Attorney, Agent, or Firm* — Jones IP Law, LLC; Dennis W. Jones

(57) ABSTRACT

A transportable pet care center includes (1) a canister having a plurality of dispensing sections for providing food, water, medicine, treats, toys, and such like to a pet (2) an electronics dashboard for providing interaction with the pet via localized entertainment and network interaction with the owner, (3) adjustable trays for receiving materials from the dispensing sections, (4) a base tray for providing stability and capturing items that fall from the trays, and (5) and extendable handle with wheel assembly for easy transport.

7 Claims, 8 Drawing Sheets

TRANSPORTABLE PET CARE CENTER

CROSS-REFERENCE TO RELATED APPLICATIONS

This application is a divisional application of U.S. patent application Ser. No. 15/367,147, entitled "Transportable Pet Care Center," filed Dec. 1, 2016, now U.S. Pat. No. 10,357,019, which claims the benefit of U.S. Provisional Application No. 62/261,453 entitled "Pet Pro Tech (Pet Professional Technology)," filed Dec. 1, 2015, each of which is incorporated by reference herein in its entirety.

BACKGROUND

This invention pertains to caring for pets. More particularly, this invention pertains to a system for care and monitoring of a pet by a person locally and or remotely.

One concern that many pet owners have in caring for their canine companions is the mental wellbeing of their dogs. Such mental wellbeing if often not given the care it may need. Good mental health for your dog leads to a more enjoyable life, while both the owner and the community are also saved from behavioral problems such as nuisance barking and other destructive behaviors. A dog's mental state can be improved, for example, if the dog doesn't think of its owner leaving in the morning as a bad thing. If a dog is prone to become stressed when its owner leaves, it is desirable that such an effect be reduced. Various methods are used for reduction of stress to the dog and include distractions such as scatter feeding, toys, treat balls, music and soothing tones to keep the dog busy and having fun while the owner is away. Checking in on the pet throughout the day also has a positive effect on mood and behavior by using cameras and monitors so that the dog can also see the owner. It is desirable to have a single pet care system that provides capability for these and many other features.

BRIEF SUMMARY

According to one embodiment of the present invention, a transportable pet care center includes (1) a canister having a plurality of dispensing sections for providing food, water, medicine, treats, toys, and such like to a pet (2) an electronics dashboard for providing interaction with the pet via localized entertainment and network interaction with the owner, (3) adjustable trays for receiving materials from the dispensing sections, (4) a base tray for providing stability and capturing items that fall from the trays, and (5) and extendable handle with wheel assembly for easy transport is provided.

According to another embodiment, a transportable pet care center structure for transport and organization of pet essentials includes (1) a cylindrical canister having an upper section and a lower section, and closed at top and open at bottom, the canister further including, (a) a plurality of dispenser sections within the upper section, each providing capability for housing pet essentials, (b), a divider between the upper section and the lower section serving as a floor to the plurality of dispenser sections, and (c) an opening in the upper section including a door that provides access to the contents of the upper section, (2) a base tray to form the foundation of the structure, (3) a plurality of adjustable trays attached to a center column extending along the height of the structure, and adjustably positionable beneath the opening in the upper section, and (4) an electronic dashboard for receiving information from user electronic devices, providing for rotation of separate elements of the structure, and further providing for positioning of separate elements of the structure, whereby the structure provides for interaction between a pet and events initiated by a remote user.

According to another embodiment, operating a transportable pet care center includes (1) receiving a request for a specified action at a transportable pet care application, from a user, (2) determining whether the request for the specified action was received from one of a user electronic device, a remote server, or an electronic dashboard within the transportable pet care center, (3) initiating the specified action at the transportable pet care center, the specified action being at least one of (a) satisfying a load food request to make food available for the pet, (b) initiating a load ball request in preparation to make the ball available for the pet, (c) initiating a launch ball request to propel the ball for play by the pet, (d) opening an audio communication channel for audio interaction with the pet, (e) opening a video communication channel for video interaction with the pet, and (f) saving a record depicting current status of relevant predefined pet care markers, whereby operation of the transportable pet care center provides for interaction between a pet and events initiated by the user.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which.

DETAILED DESCRIPTION

A transportable pet care center within a pet care system to be used in the care and monitoring of a pet by a person locally and or remotely. In particular, a transportable pet care center provides via existing networks for feeding, monitoring, entertaining and communicating with a pet, whether from the office or from the other side of the world.

One concern that many pet owners have in caring for their canine companions is the mental wellbeing of their dogs. Such mental wellbeing if often not given the care it may need. Good mental health for your dog leads to a more enjoyable life, while both the owner and the community are also saved from behavioral problems such as nuisance barking and other destructive behaviors. A dog's mental state can be improved, for example, if the dog doesn't think of its owner leaving in the morning as a bad thing. If a dog is prone to become stressed when its owner leaves, it is desirable that such an effect be reduced. Various methods are used for reduction of stress to the dog and include distractions such as scatter feeding, toys, treat balls, music and soothing tones to keep the dog busy and having fun while the owner is away. Checking in on the pet throughout the day also has a positive effect on mood and behavior by using cameras and monitors so that the dog can also see the owner. It is desirable to have a single pet care system that provides capability for these and many other features.

Figure 1:
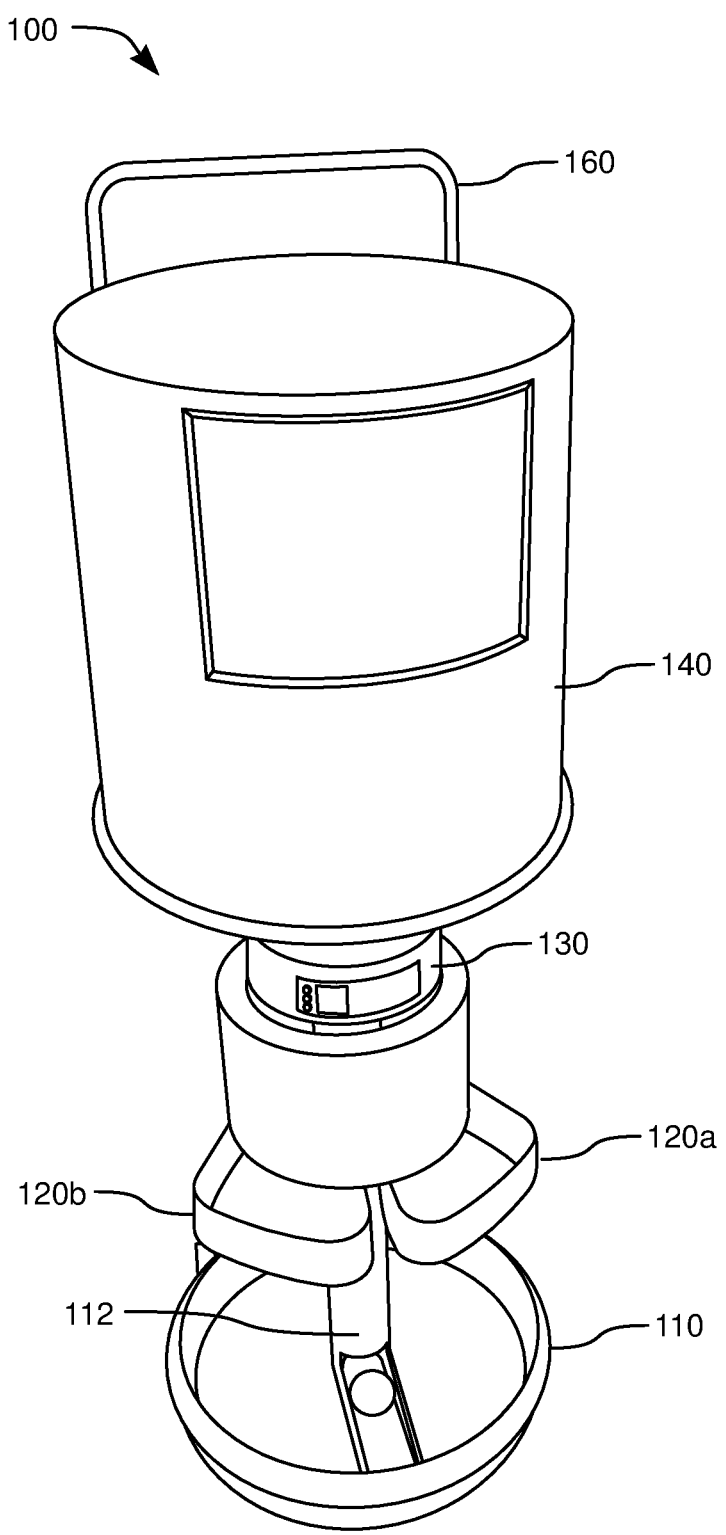
FIG. 1 is a perspective view of a transportable pet care unit in a transportable pet care system.

FIG. 1 illustrates a perspective view of one embodiment of a transportable pet care center 100 of a pet care system 90. The transportable pet care center 100 includes a base tray 110, adjustable trays 120, an electronic dashboard 130, a canister 140 and a handle 160 each connected internally via a chute 112 extending vertically toward the canister 140. In the illustrated embodiment, the transportable pet care center 100 is shown in an extended or open configuration, that is, the transportable pet care center 100 provides for the feeding, monitoring, communicating with and entertainment of a pet. The transportable pet care center 100 can be used to transport items necessary for the care of a pet while traveling. Additionally, the transportable pet care center 100 can be used for the care of a pet at home while the owner is away.

The transportable pet care center 100 is a highly durable, lightweight structure. As discussed further below, the majority of the parts are constructed plastic, such as high-impact polystyrene.

Figure 2:
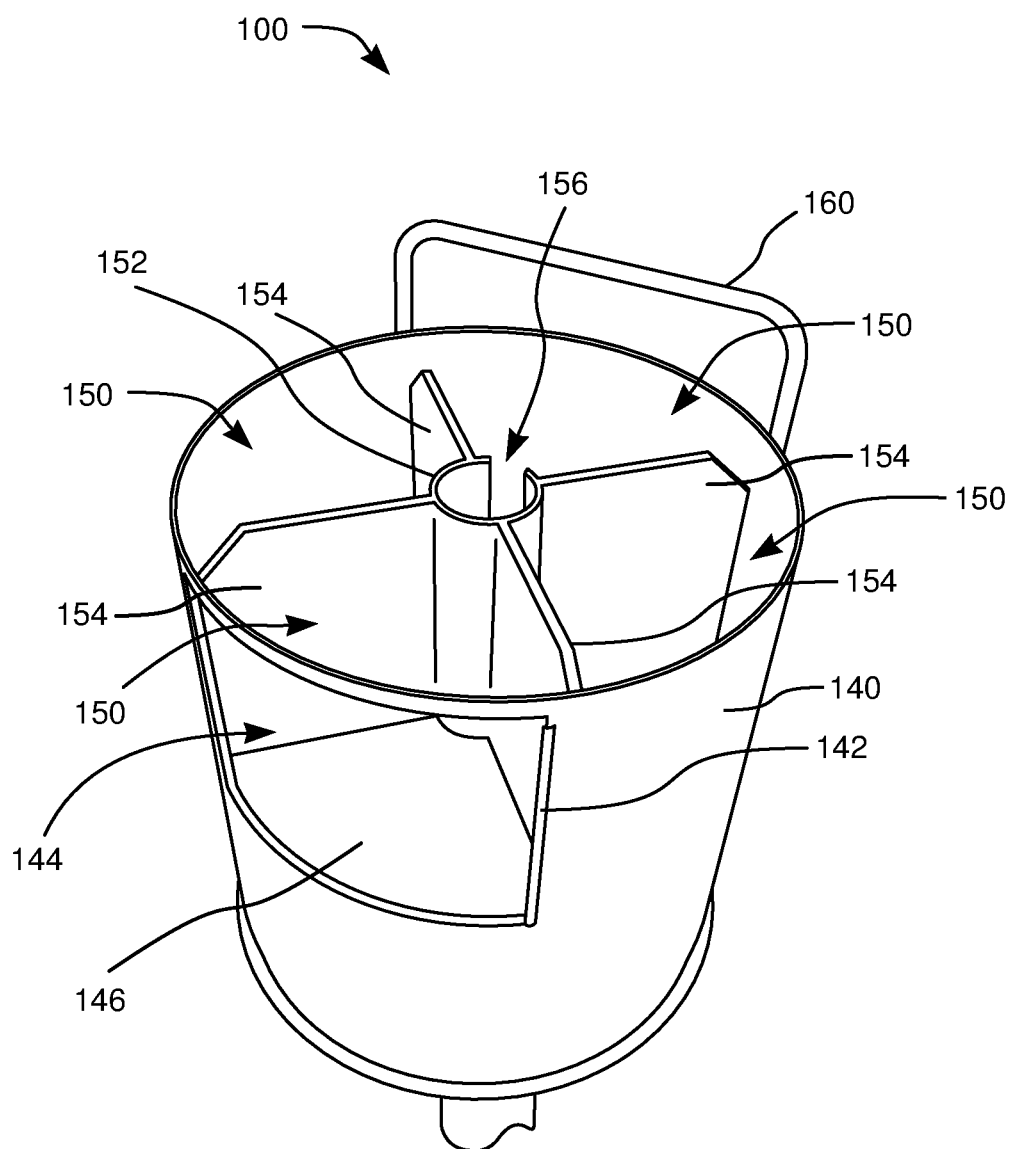
FIG. 2 is a perspective view illustrating the dispenser sections of the transportable pet care unit of FIG. 1.

FIG. 2 illustrates one embodiment of a canister 140 for a transportable pet care center 100. The canister 140 serves as the housing for the transportable pet care center 100 in a closed configuration such as would be used for storage or travel. The canister 140 includes multiple dispenser sections 150 that provide storage space for pet-related items, such as medication, food, treats, toys, grooming items and such like. Separating such items provides for a hygienic and safe environment, free from contamination and inaccessible to pets and small children. The illustrated embodiment includes four dispenser sections 150. Of course, the canister 140 may include any number of separate dispenser sections.

The canister 140 includes an upper section and lower section. The dispenser sections 150 are positioned in the upper section of the canister 140, when the canister 140 is in an upright position. The lower section of the canister 140 provides closed covering for the remainder of the transportable pet care center 100, including the electronic dashboard 130, the adjustable trays 120 and the base trays 110. That is, to close the transportable pet care center 100, the canister 140 would be pushed down to cover the lower portions.

The upper section of the canister 140 includes multiple dispenser sections 150. The dispenser sections 150 are bounded by a series of dividers 154 extending outward from a center brace 152 and a floor 146 situated beneath the dividers 154. Together the dispenser sections 150 are rotatable around the center brace 152. The center brace 152 includes a dispenser slot 156 for dispensing items from a selected dispenser section 150. The upper section of the canister 140 includes a sliding door 142 that reveals an opening 144 into the upper section of the canister 140. The dispenser sections 150 may be rotated to provide access via the sliding door 142 to the contents of a particular dispenser section 150.

Of course, in an alternative embodiment, the sliding door 142 is replaced by a hinged door that opens outward. In such an embodiment, label strips can be applied to the inside of the door for logging inventory. Many materials may be used for such logging, for example a dry erase surface provides similar capability.

In some embodiments, the canister 140, the center brace 152, the dividers 154, the sliding door 142 and the floor 146 are each made from plastic. In one such embodiment, each of the above items is made from high-impact polystyrene. Pure polystyrene is a colorless and hard plastic having limited flexibility. Polystyrene can be cast into molds with sufficient detail for the respective items of the transportable pet care center 100. Though polystyrene can be transparent it can also be made to take on color. Of course, the various items of the transportable pet care center 100 are typically colored according to market considerations.

Where necessary, each piece is welded to an adjacent piece along adjoining edges. For example, each divider 154 is welded along the corresponding center brace 152.

In one embodiment, each piece is welded to an adjacent piece via ultrasonic welding. Ultrasonic welding is sometimes referred to as sonic welding. High frequency (15 kHz-40 kHz) low-amplitude vibration creates heat via friction between the adjacent pieces. The energy is concentrated for maximum weld strength between the interfaces of the two surfaces. Ultrasonic welding is the fastest heat-sealing technology available and can be used on most plastic materials.

In another embodiment, adjacent pieces are welded via solvent welding. In such an embodiment a solvent is applied to temporarily dissolve the polymer, typically at room temperature. The polymer chains of the two materials are free to move within the liquid and mingle with similarly dissolved polymer chains within the other material. After a sufficient time, the solvent permeates through the polymer, so that the polymer chains lose their mobility. A solid mass of entangled polymer chains remains, forming a solvent weld.

Those of skill in the art will readily appreciate that other welding methods are also appropriate for joining the adjacent pieces in the formation of the transportable pet care center 100.

Figure 3:
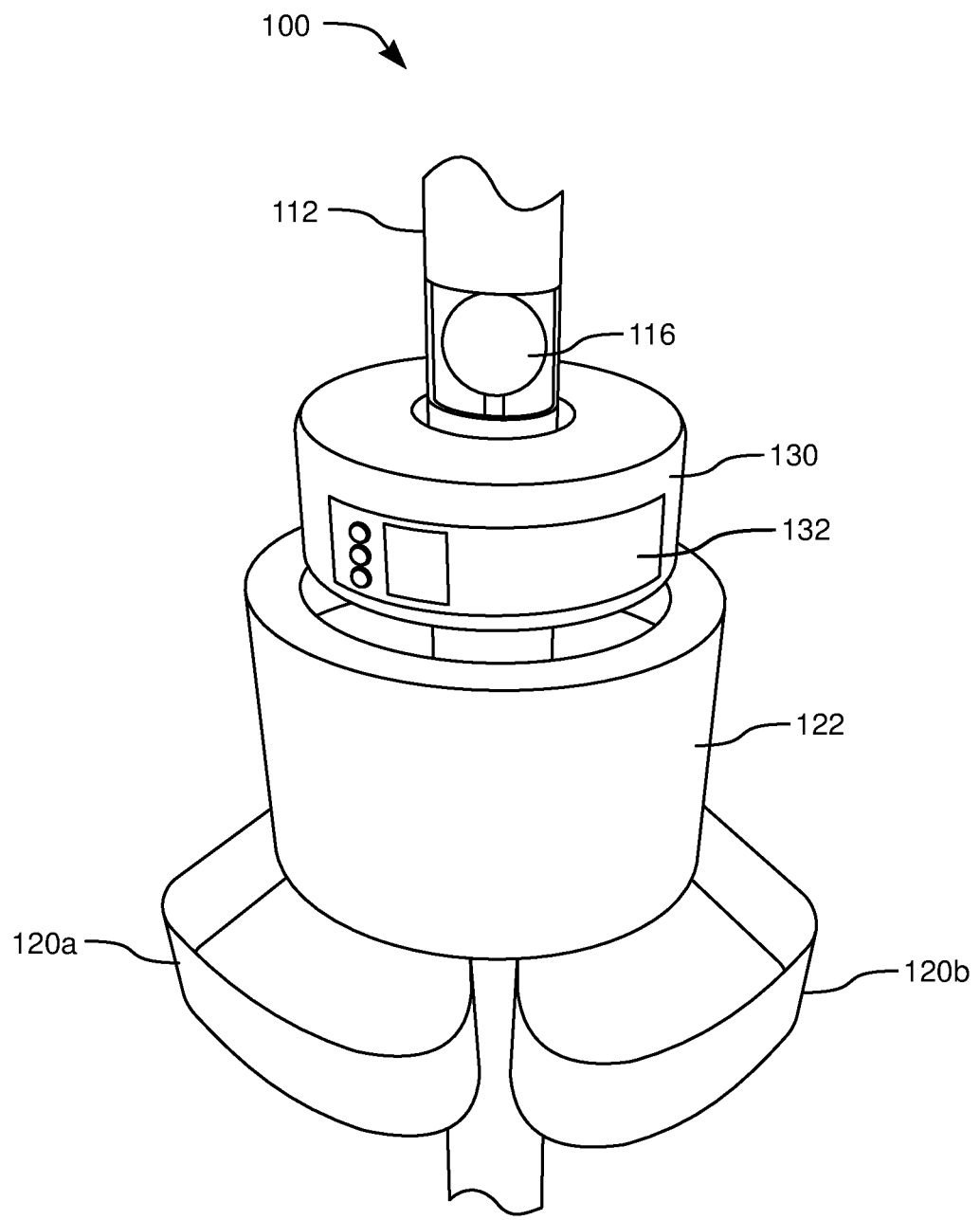
FIG. 3 is a perspective view illustrating the electronic dashboard of the transportable pet care unit.

FIG. 3 is a perspective view illustrating one embodiment of an electronic dashboard 130 for the transportable pet care center 100. The transportable pet care center 100 includes an electronic dashboard 130 and a spacer 122. The spacer 122 provides a particular spacing below the electronic dashboard 130 and above the adjustable trays 120. The transportable pet care center 100 provides the following capabilities, including but not limited to USB connectivity, built-in memory, interactive dispenser, camera, Wi-Fi, microphone, speakers and a monitor. Such capabilities are provided for within the electronic dashboard 130 housing. A panel 132 provides access to the varied functionalities. In one embodiment the panel 132 is removable to provide access to the functionality within the electronic dashboard 130. In another embodiment, a panel 132 flips or folds open to provide access to the functionality within the electronic dashboard 130. The electronic dashboard 130 provides a means of engagement and mental stimulation for the benefit of the pet, and monitoring capability for the benefit of the owner, particularly in situations where prolonged physical separation is necessary. For example, if the owner is detained at the office or in unexpected traffic, they can use a smartphone app to speak directly to their pet at home via the electronic dashboard 130, taking advantage of the many capabilities of the transportable pet care center 100 to put their pet(s) at ease.

In one embodiment, removing or opening the panel 132 provides access to a touch screen control panel for input/output communications with the electronic dashboard 130 of the transportable pet care center 100. Such a control panel provides capability to sync an application with the mobile control panel. In one embodiment, the screen is tiltable. In one embodiment, monitoring of pet appointments, food and water levels, and such like is provided. In one embodiment, reminders can be programmed for such occurrences as medication, walking, birthday, doctor appointment, etc. In one embodiment, timers may also be set for entertainment, treats, playing music on schedule or on command remotely. In one embodiment, positive tones can be set to decibel levels heard only by the pet. In one embodiment, the camera view and zoom is adjustable. A two-way microphone and camera capability is provided. WiFi capability is provided. Built-in memory provides storage for videos and memories. A re-chargeable battery provides long-life.

The many features provide several care options for your pet to combat stress and release energy necessary to maintain good physical and mental health. The transportable pet care center 100 provides for improved pet health through consistent feeding and or medication times, entertainment, soothing tones and or music and visual monitoring and interaction, such as FaceTime® or Skype®. The transportable pet care center 100 provides for improved mental health via playtime and songs/tones for positive reinforcement when a pet is left alone.

In some embodiments, the electronic dashboard 130 housing, the panel 132, and the spacer 122, in addition to some other parts, are each made from plastic. As noted previously, each of the above items is made from high-impact polystyrene. Pure polystyrene is a colorless and hard plastic having limited flexibility. Polystyrene can be cast into molds with sufficient detail for the respective items of the transportable pet care center 100. Though polystyrene can be transparent it can also be made to take on color. Of course, the various items of the transportable pet care center 100 are typically colored according to market considerations.

Figure 4:
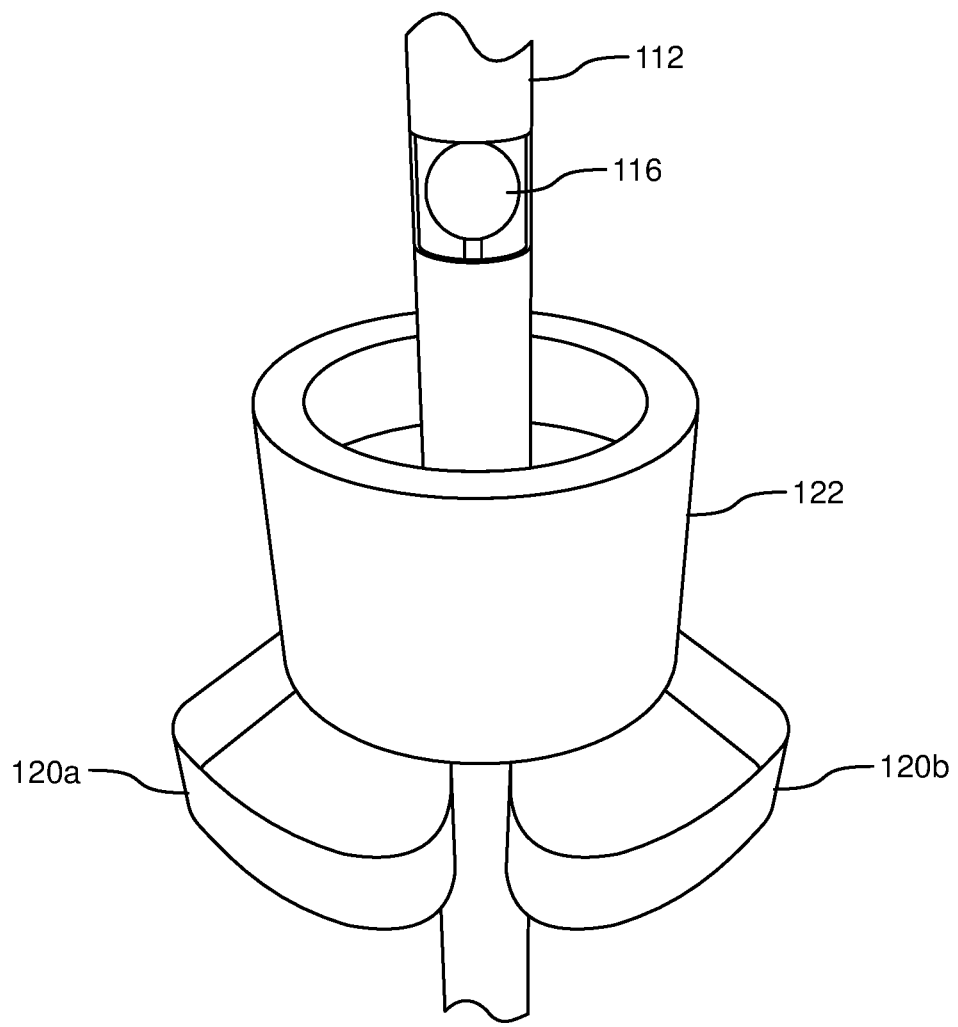
FIG. 4 is a perspective view illustrating the adjustable trays of the transportable pet care unit.

FIG. 4 is a perspective view illustrating one embodiment of the adjustable trays 120a, 120b of the transportable pet care center 100. The adjustable trays 120a, 120b are multilevel serving trays that can be adjusted to accommodate a pet from youth to old age. The adjustable trays 120a, 120b provide the capability for a pet to maintain ideal posture during feeding. In the illustrated embodiment, each respective adjustable tray 120a, 120b is attached on either side to the chute 112. Each adjustable tray 120a, 120b may be raised or lowered to accommodate the pet's height. The transportable pet care center 100 includes a round opening 116 in the chute 112. This round opening 116 provides for the contents of the dispenser section 150 to be lowered to various destinations along the height of the chute 112. As noted previously, the chute 112 extends upward to the center brace 152. In some embodiments the chute 112 and the center brace 152 make up one continuous piece that extends along the entire height of the transportable pet care center 100.

The adjustable trays 120a, 120b provide for adjusting the height of a serving dish to an optimum height for the pet. Such an adjustment provides for ensuring that the pet utilizes good and healthy posture while eating.

In some embodiments, the adjustable trays 120a, 120b are made from plastic. As noted previously, each adjustable tray 120a, 120b is made from high-impact polystyrene. Pure polystyrene is a colorless and hard plastic having limited flexibility. Polystyrene can be cast into molds with sufficient detail for the respective items of the transportable pet care center 100. Though polystyrene can be transparent it can also be made to take on color. Of course, the various items of the transportable pet care center 100 are typically colored according to market considerations.

Figure 5:
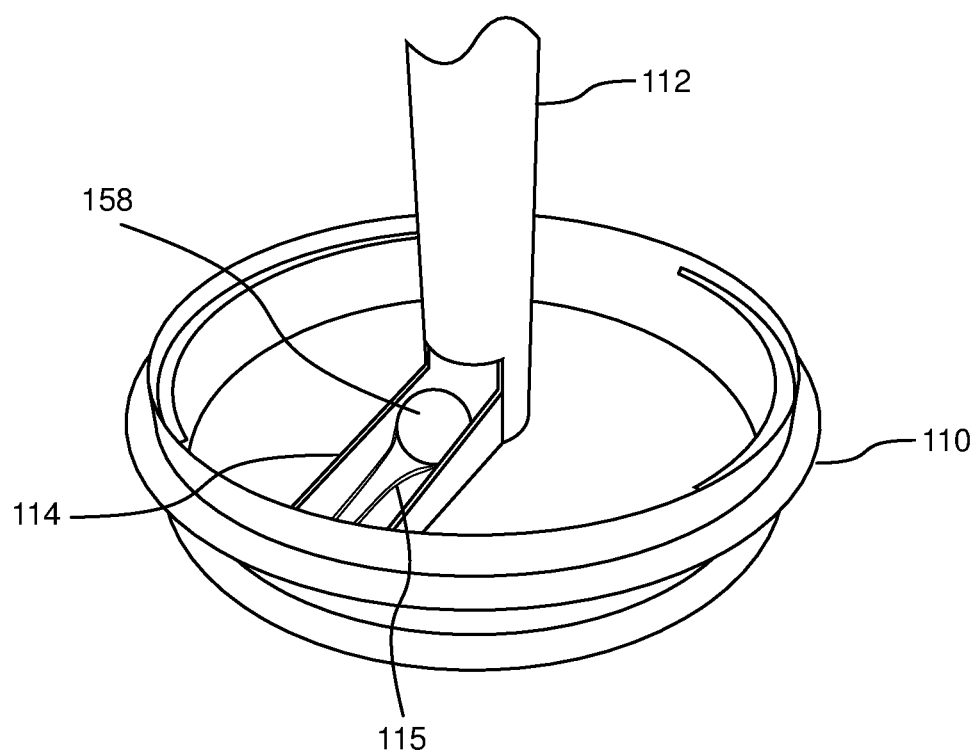
FIG. 5 is a perspective view of the base tray of the transportable pet care unit.

FIG. 5 illustrates a perspective view of one embodiment of a base tray 110 of the transportable pet care center 100. The base tray 110 provides the foundation of the transportable pet care center 100. A chute 112 extends upward from the middle of the base tray 110 toward the canister 140. The base tray 110 has a diameter and mass substantial enough for stability, yet not so cumbersome as to prevent mobility of the transportable pet care center 100. The base tray 110 also includes a trough 114 extending outward from the lower end of the chute 112 to one edge of the base tray 110. The trough 114 also includes a launcher 115 near the lower end of the chute 112. The launcher 115 provides capability for propelling a ball, other toy or treat a particular distance into the air. In some embodiments, a sensor (not shown) is utilized to indicate when a ball (or other toy) is in place to be launched.

In some embodiments, the base tray 110, the chute 112, the trough 114, and the launcher 115, in addition to some other parts, are made from plastic. As noted previously, each of the above items is made from high-impact polystyrene. Pure polystyrene is a colorless and hard plastic having limited flexibility. Polystyrene can be cast into molds with sufficient detail for the respective items of the transportable pet care center 100. Though polystyrene can be transparent it can also be made to take on color. Of course, the various items of the transportable pet care center 100 are typically colored according to market considerations.

Figure 6:
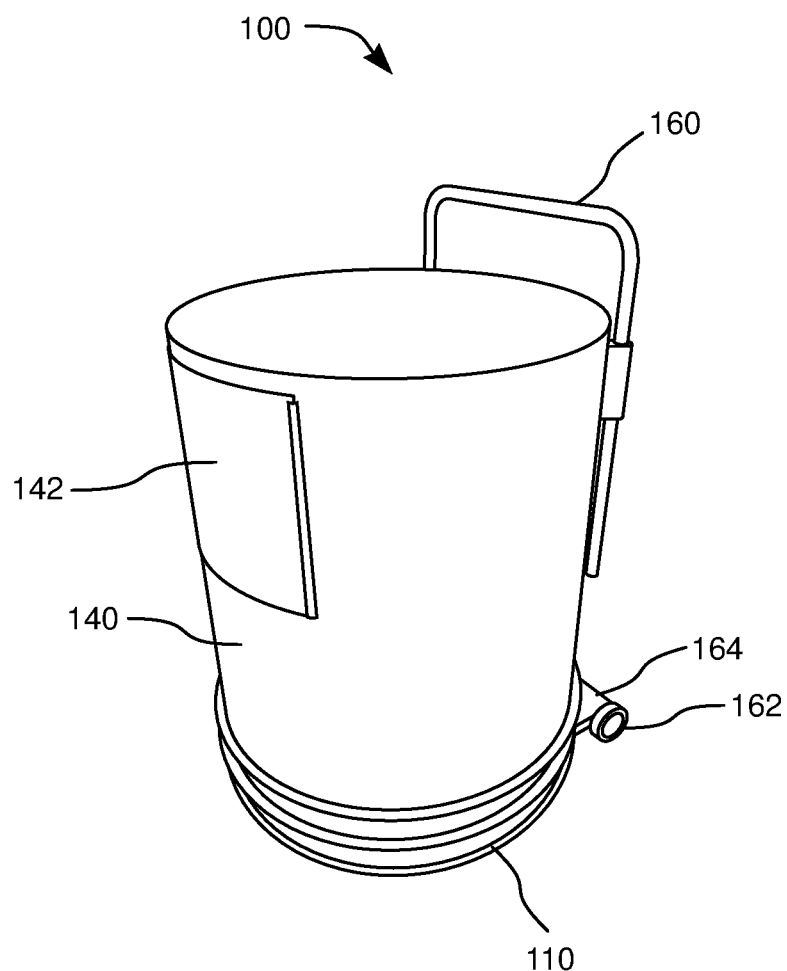
FIG. 6 is a perspective view of the transportable pet care unit in a closed configuration.

FIG. 6 illustrates a perspective view of the transportable pet care center 100 in a closed configuration. In its closed configuration, the visible portions of the transportable pet care center 100 includes the canister 140, the base tray 110, the sliding door 142, a wheel assembly 164, and an extendable handle 160. The base tray 110 includes an edge that is fitted to the lower portion of the canister 130. The edge can be lockable view twisting the base tray 110 or the canister 140 to secure them in the closed configuration and in position respective to each other. Of course, the canister 140 and the base tray 110 could also be secured in other ways such as grooves, snap-into-position, and such like.

The canister 140 extends toward the base tray 110, and in the closed configuration covers the base tray 110, the adjustable trays 120a, 120b, and the electronic dashboard 130. The closed configuration coverage by the canister 140 provides for protection of the adjustable trays 120a, 120b, the electronics dashboard 130, and the contents within the dispenser sections 150 of the canister 140. When the canister 140 is in the closed configuration, the transportable pet care center 100 is much easier to move or re-position.

A sliding door 142 is visible for securing contents within the canister 140. The sliding door 142 can be opened for refilling one or more dispenser sections 150, or for emptying contents into one of the adjustable trays 120a, 120b.

An extendable handle 160 extends along one side of the canister 140 toward a wheel assembly 164. The handle 160 provides for easy movement of the transportable pet care center 100 without the need for lifting. The wheel assembly 164 includes durable wheels 162 at each end of the assembly 164. With the extendable handle 160 and the wheel assembly 164, the transportable pet care center 100 is as easy to move as a piece of luggage.

In some embodiments, the canister 140, the sliding door 142, and the base tray 110, in addition to some other parts, are each made from plastic. As noted previously, each of the above items is made from high-impact polystyrene. Pure polystyrene is a colorless and hard plastic having limited flexibility. Polystyrene can be cast into molds with sufficient detail for the respective items of the transportable pet care center 100. Though polystyrene can be transparent it can also be made to take on color. Of course, the various items of the transportable pet care center 100 are typically colored according to market considerations.

Figure 7:
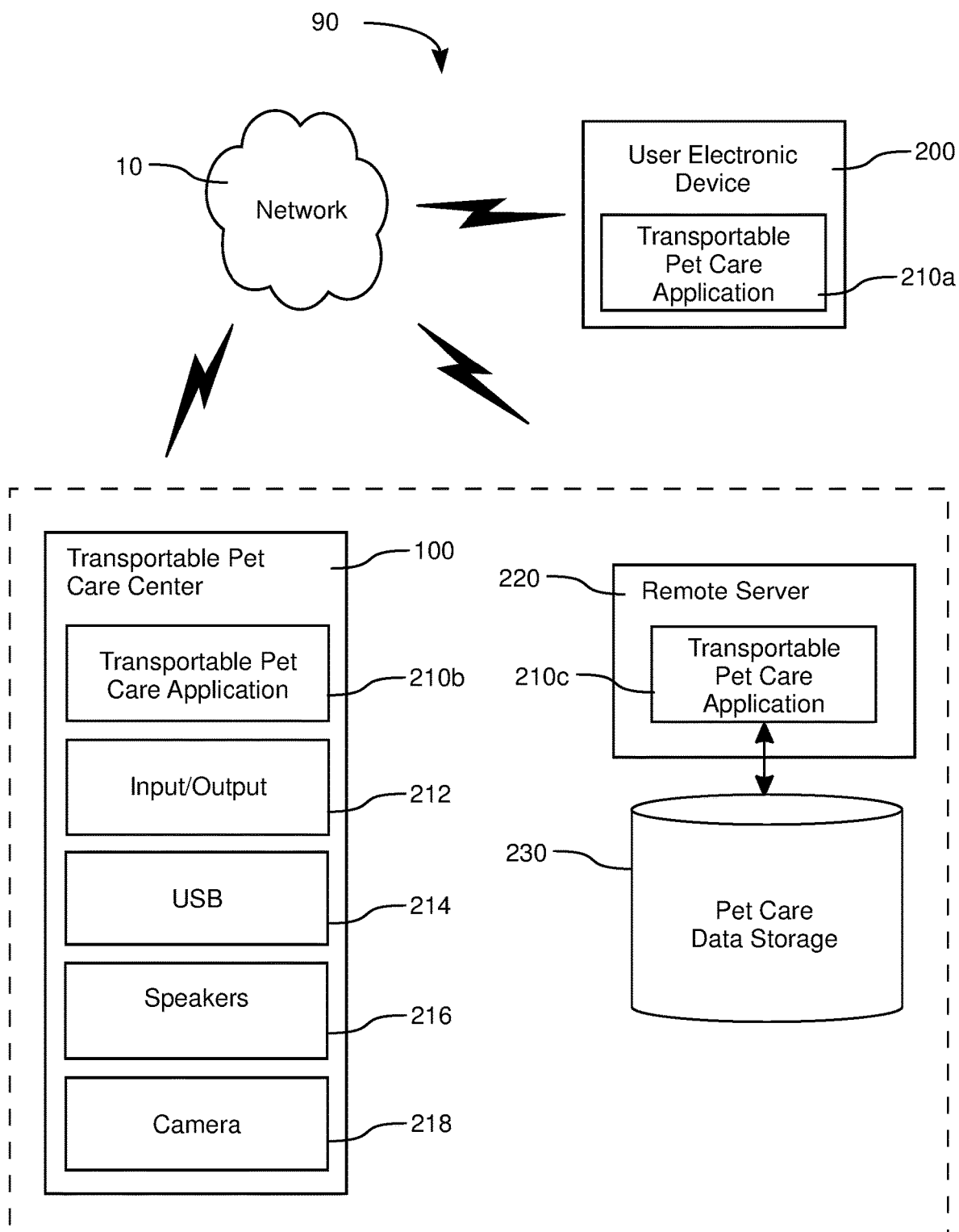
FIG. 7 is a system diagram illustrating various components of an exemplary transportable pet care system.

FIG. 7 is a system diagram 800 illustrating various components of an exemplary transportable pet care system 90. The transportable pet care system 90 includes a transportable pet care unit 100 as described above, a user electronic device 200, and a remote server 220, all interconnectable via a network 10, such as a local-area network ("LAN"), a wide-area network ("WAN"), the Internet, or any other networking topology known in the art that connects computing devices to each other and to remote computers.

The transportable pet care unit 100 includes a transportable pet care application 210b, input/output 212, USB 214, speakers 216, and a camera 218. The transportable pet care unit 100 includes additional capabilities and features that are not shown in FIG. 7, such as internally available and controlled memory, controlling the interactive dispenser section, Wi-Fi capability, and a microphone.

The transportable pet care application 210b ("the pet care application") is one of three versions of the pet care application for interfacing with, programming, and utilizing the transportable pet care center 100. In addition to the features noted above, the transportable pet care application 210b is utilized to rotate the dispenser sections 150 and/or the adjustable trays 120a, 120b for the removal and/or placement of contents into one of the adjustable trays 120a, 120b. The transportable pet care application 210b also provides capability for propelling a ball 158 from the launcher 115 (described below) so that the pet can retrieve the ball (or other toy). Depending on the availability of toy balls 158 and/or the training of the pet, endless amounts of exercise and interactivity with the pet can be managed in this way.

In one embodiment, the input/output 212 capability is provided by a touch screen available within and accessible from the electronics dashboard 130. For example, a standard touch screen could fold down from behind the panel 132, be on the reverse of a panel 132 that folds open or down, or other accessible locations.

In one embodiment, the transportable pet care unit 100 also provides USB 214 connectivity for uploading of pictures, sound files, and such that may be useful for interacting with the pet. For example various chimes or other sounds can be utilized to signal meal time, play time, owner interaction time, rewards, or any other type interaction as desired by the pet owner.

In one embodiment, the transportable pet care unit 100 also provides speakers 216 (not shown) so that the pet can hear the various sound files described above. In one embodiment, the speakers are part of the input/output 212 described above.

In one embodiment, the transportable pet care unit 100 also provides a camera 218 for transmitting images of the pet to the owner, or even to record at intermittent points.

A remote server 220 provides capability for accessing pet care data and operating the transportable pet care unit 100 remotely. Any of the features described above with relevance to the transportable pet care unit 100 may also be accessed and performed via remote server 220. If the transportable pet care unit 100 is available on a network, then a user may simply log into the remote server 220 and have access to any of the functionality described above. The remote server 220 includes its specific version of the transportable pet care application 210c which provides the same functionality as that of the transportable pet care unit 100.

Additionally, any data collected from the transportable pet care unit 100 may be selectively stored within the pet care data storage 230 unit available at the remote server 220. The data stored within the pet care data storage 230 may accessed via logging into the remote server 220 or also from a user electronic device 200.

A user electronic device 200 may also be used for interacting with a pet via control and operation of the transportable pet care unit 100 remotely. A user electronic device 220 may include such devices as a conventional server computer, workstation, desktop computer, laptop, network appliance, personal digital assistant ("PDA"), electronic book reader, digital cellular phone, smartphone, or other computing device, and may be utilized to access the transportable pet care center 100 as noted above.

The user electronic device 200 also includes its specific version of the transportable pet care application 210a which provides the same functionality as that of the transportable pet care unit 100. If the transportable pet care unit 100 is available on a network, then a user may utilize the user electronic device 200 to connect with the transportable pet care unit 100 and have access to any of the functionality described above.

Figure 8:
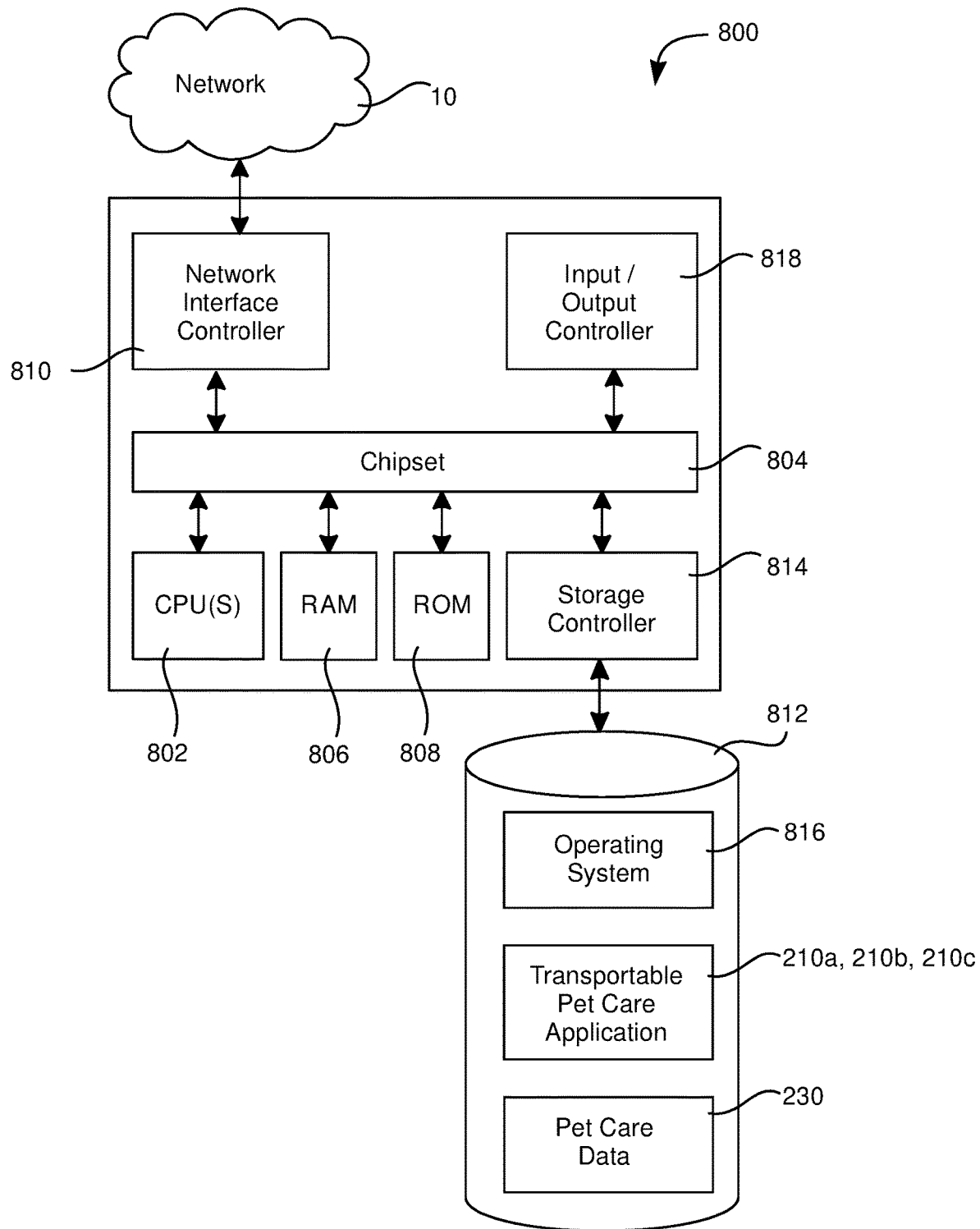
FIG. 8 is a computer architecture diagram showing an illustrative computer hardware architecture for computing devices described in embodiments presented herein.

FIG. 8 is a computer architecture diagram showing an exemplary computer architecture for a computing device 800 capable of executing the software components described herein. The computer architecture shown in FIG. 8 illustrates a conventional server computer, workstation, desktop computer, laptop, network appliance, personal digital assistant ("PDA"), electronic book reader, digital cellular phone, or other computing device, and may be utilized to execute any aspects of the software components presented herein and/or to interact with or execute the capabilities of the transportable pet care center 100 of the transportable pet care system 100. For example, and without limitation, the computer architecture shown in FIG. 8 might be utilized to implement computer systems that execute software components for implementing all or part of the functionality provided by the transportable pet care system 90, the transportable pet care center 100, various sensors, processing and storage of pet care data 230 and various external devices for storage of data, managing and/or monitoring pet care.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 808. The CPUs 802 are standard programmable processors that perform arithmetic and logical operations necessary for the operation of the computer 800.

The CPUs 802 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 808 provides an interface between the CPUs 802 and other components and devices on the baseboard. For instance, the chipset 808 may provide an interface to a random access memory ("RAM") 804, used as the main memory in the computer 800. The chipset 808 may further provide an interface to a computer-readable storage medium such as a read-only memory ("ROM") 806 or non-volatile RAM ("NVRAM") for storing basic routines that help to startup the computer 800 and to transfer information between the various components and devices. The ROM 806 or NVRAM may also store other software components necessary for the operation of the computer 800 in accordance with the embodiments described herein.

According to various embodiments, the computer 800 may operate in a networked environment using logical connections to remote computing devices and computer systems through the network 10, such as a local-area network ("LAN"), a wide-area network ("WAN"), the Internet, or any other networking topology known in the art that connects the computer 800 to remote computers. The chipset 808 includes functionality for providing network connectivity through a network interface controller ("NIC") 810, such as a gigabit Ethernet adapter. The NIC 810 is capable of connecting the computer 800 to other computing devices over the network 10. It should be appreciated that any number of NICs 810 may be present in the computer 800, connecting the computer 800 to various types of networks and remote computer systems.

The computer 800 may be connected to a mass storage device 812 that provides non-volatile storage for the computer 800. The mass storage device 812 may store system programs, application programs, other program modules, and data, which are described in greater detail herein. The mass storage device 812 may be connected to the computer 800 through a storage controller 814 connected to the chipset 808. The mass storage device 814 may consist of one or more physical storage units. The storage controller 814 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 800 may store data on the mass storage device 814 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, and the like. For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 may have access to other computer-readable storage media to store and retrieve information, such as program modules, data structures, or other data. It should be appreciated by those skilled in the art that computer-readable storage media can be any available non-transitory media that may be accessed by the computer 800. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 812 may store other system or application programs and data utilized by the computer 800, such as the transportable pet care system 90, the transportable pet care center 100, processing and storage of pet care data 230 and various external devices for storage of data, managing and/or monitoring tampering and/or security, each of which was described above in regard to FIGS. 1-7.

In one embodiment, the mass storage device 814 or other computer-readable storage media may be encoded with computer-executable instructions that, when loaded into the computer 800, may transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 may have access to computer-readable storage media storing computer-executable instructions that, when executed by the computer, perform various routines as described above with regard to FIG. 8, for example.

The computer 800 might also include an input/output controller 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that various concepts and technologies for providing transportable pet care center 100 and for a comprehensive transportable pet care system 90 for providing remote care, feeding, and entertainment for a pet, have been presented herein. Although some of the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

Accordingly, the present invention may be realized in hardware, software, or a combination thereof. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

From the foregoing description, it will be recognized by those skilled in the art that various concepts and technologies for providing a transportable pet care center 100 and toward a comprehensive transportable pet care system 90 for providing remote care, feeding, and entertainment for a pet, has been provided.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for operating a transportable pet care center, the method comprising:
    receiving a request for a specified action at a transportable pet care application, from a user, wherein the transportable pet care center includes: a cylindrical canister having an upper section and a lower section, the canister being closed at top and being open at bottom, the canister further including: a plurality of dispenser sections within the upper section, each dispenser section providing capability for housing pet essentials; a plurality of dividers, each divider providing separation between respective dispenser sections of the upper section; a floor beneath the plurality of dividers, the floor separating the upper section and the lower section, the floor further providing a base to each dispenser section; and an opening in the upper section, the opening including a door that provides access to the contents of the upper section; a base tray to form the foundation of the center; a plurality of adjustable trays attached to a center column extending along the height of the center, the adjustable trays being adjustably positionable beneath the opening in the upper section; and an electronic dashboard for receiving information from the user, the electronic dashboard providing for rotation of dispenser sections of the center, and further providing for positioning of dispenser sections of the center;
    determining whether the request for the specified action was received from one of the following:
        a user electronic device;
        a remote server; and
        an electronic dashboard within the transportable pet care center;
    initiating the specified action at the transportable pet care center, the specified action being at least one of:
        satisfying a load food request to make food available for the pet;
        initiating a load ball request in preparation to make the ball available for the pet;
        initiating a launch ball request to propel the ball for play by the pet;
        opening an audio communication channel for audio interaction with the pet;
        opening a video communication channel for video interaction with the pet; and
        saving a record depicting current status of relevant predefined pet care markers,
    whereby operation of the transportable pet care center provides for interaction between a pet and events initiated by the user.

2. The method of claim 1, satisfying the load food request further comprising:
    rotating the canister via command of the electronic dashboard to a prescribed position so that a specified food item within a dispenser section of the canister is accessible at the opening of the upper section;
    positioning, via the electronic dashboard, an adjustable tray beneath the opening in the upper section; and
    initiating an action to cause the specified food item to be emptied from the dispenser section of the canister and into the adjustable tray.

3. The method of claim 1, satisfying the load ball request further comprising:
    rotating the canister via command of the electronic dashboard to a prescribed position so that a dispenser section of the canister having toy balls is accessible at a round opening within a chute in the upper section;
    positioning, via the electronic dashboard, a toy ball within the round opening; and
    initiating an action to cause the toy ball to descend the chute to the base tray.

4. The method of claim 1, satisfying the launch ball request further comprising initiating an action to cause a launcher to propel the toy ball up and away from the center.

5. The method of claim 1, opening an audio communication channel further comprising opening a microphone line and opening a speaker line for communication between the pet and the user.

6. The method of claim 1, opening a video channel further comprising opening a camera, opening a microphone line, and opening a speaker line for audio and video communication between the pet and the user.

7. The method of claim 1, saving a record depicting current status further comprising storing measurements of predefined markers within a memory unit, wherein the memory unit is located within one of the following:
   the user electronic device;
   the remote server;
   the electronic dashboard within the transportable pet care center; and
   a location remotely accessible to the user.

* * * * *